(12) United States Patent
Shigihara et al.

(10) Patent No.: US 10,605,302 B2
(45) Date of Patent: Mar. 31, 2020

(54) TILTING PAD GAS BEARING

(71) Applicant: MITSUBISHI HEAVY INDUSTRIES COMPRESSOR CORPORATION, Tokyo (JP)

(72) Inventors: Takuzo Shigihara, Tokyo (JP); Noriyuki Hayashi, Tokyo (JP); Tadasuke Nishioka, Tokyo (JP); Hideki Nagao, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 16/066,596

(22) PCT Filed: Dec. 26, 2016

(86) PCT No.: PCT/JP2016/088673
§ 371 (c)(1),
(2) Date: Jun. 27, 2018

(87) PCT Pub. No.: WO2017/134963
PCT Pub. Date: Aug. 10, 2017

(65) Prior Publication Data
US 2019/0010977 A1    Jan. 10, 2019

(30) Foreign Application Priority Data

Feb. 4, 2016 (JP) .................................. 2016-019968

(51) Int. Cl.
*F16C 32/06* (2006.01)
*F16C 17/03* (2006.01)
(Continued)

(52) U.S. Cl.
CPC ............ *F16C 17/035* (2013.01); *F01D 25/16* (2013.01); *F04D 29/057* (2013.01); *F16C 17/03* (2013.01);
(Continued)

(58) Field of Classification Search
CPC .... F16C 17/03; F16C 17/035; F16C 32/0666; F16C 33/06; F16C 2360/00; F16C 33/121;
(Continued)

(56) References Cited

U.S. PATENT DOCUMENTS 3,829,180 A * 8/1974 Gardner .................. F16C 17/06
384/306
3,972,572 A * 8/1976 Hohn ...................... F16C 17/03
384/312
(Continued)

FOREIGN PATENT DOCUMENTS

JP    S50-031342 U    4/1975
JP    H03-121306 A    5/1991
(Continued)

OTHER PUBLICATIONS

International Search Report for corresponding International Application No. PCT/JP2016/088673 dated Feb. 28, 2017 (4 pages).
(Continued)

*Primary Examiner* — Alan B Waits
(74) *Attorney, Agent, or Firm* — Osha Liang LLP

(57) ABSTRACT

A tilting pad gas bearing includes: a plurality of bearing pads disposed in a circumferential direction of a rotor; and a pivot member that swingably supports the bearing pads. Each of the bearing pads has a curved shape and includes: a pad main body supported by the pivot member; a heat insulating material layer disposed on a side of the pad main body that faces the outer circumferential surface of the rotor, and
(Continued)

formed of a material having a thermal conductivity lower than a thermal conductivity of the pad main body; and a concave portion disposed in an outer circumferential surface on an outer circumferential side of the bearing pad in a curving direction. A base end of the pivot member is fixed to a housing, and the pivot member has a protruding portion that passes through the housing.

8 Claims, 9 Drawing Sheets

(51) Int. Cl.
*F01D 25/16* (2006.01)
*F16C 33/12* (2006.01)
*F16C 17/24* (2006.01)
*F16C 33/04* (2006.01)
*F04D 29/057* (2006.01)

(52) U.S. Cl.
CPC ........ *F16C 17/243* (2013.01); *F16C 32/0614* (2013.01); *F16C 33/043* (2013.01); *F16C 33/121* (2013.01); *F16C 33/124* (2013.01); *F16C 33/125* (2013.01); *F05D 2240/54* (2013.01); *F05D 2300/501* (2013.01); *F05D 2300/5021* (2013.01); *F05D 2300/5024* (2013.01); *F16C 2202/22* (2013.01); *F16C 2202/24* (2013.01); *F16C 2360/00* (2013.01)

(58) Field of Classification Search
CPC .... F16C 33/043; F16C 33/125; F16C 17/243; F16C 2202/22; F16C 2202/24; F04D 29/057; F05D 2300/501; F05D 2300/502; F05D 2240/54; F01D 25/00; F01D 25/16
See application file for complete search history.

(56) References Cited

U.S. PATENT DOCUMENTS

| | | | | |
|---|---|---|---|---|
| 4,360,165 A | * | 11/1982 | Sugiyama | B05B 5/0415 239/223 |
| 4,368,853 A | * | 1/1983 | Morishita | B05B 5/0415 239/223 |
| 4,373,673 A | * | 2/1983 | Morishita | B05B 5/0415 239/128 |
| 4,636,095 A | * | 1/1987 | Gerling | F16C 17/03 384/114 |
| 4,643,592 A | * | 2/1987 | Lewis | F16C 17/03 384/100 |
| 5,700,546 A | | 12/1997 | Fujii et al. | |
| 2008/0095482 A1 | * | 4/2008 | Swann | F16C 17/03 384/192 |
| 2013/0336605 A1 | * | 12/2013 | Buguin | F01D 25/166 384/114 |
| 2015/0139573 A1 | * | 5/2015 | Klusacek | F04D 29/057 384/114 |
| 2017/0045082 A1 | * | 2/2017 | Rockefeller | F16C 17/03 |

FOREIGN PATENT DOCUMENTS

| | | | | |
|---|---|---|---|---|
| JP | H07-317752 A | | 12/1995 | |
| JP | H08-105447 A | | 4/1996 | |
| JP | 09329134 A | * | 12/1997 | ............. F16C 17/03 |
| JP | 2001-124062 A | | 5/2001 | |
| JP | 2005-282692 A | | 10/2005 | |
| JP | 2015-152147 A | | 8/2015 | |

OTHER PUBLICATIONS

Written Opinion for corresponding International Application No. PCT/JP2016/088673, dated Feb. 28, 2017 (10 pages).
International Search Report for corresponding International Application No. PCT/JP2016/088673 dated Feb. 28, 2018 (4 pages).

* cited by examiner

TILTING PAD GAS BEARING

TECHNICAL FIELD

The present invention relates to a tilting pad gas bearing.
Priority is claimed on Japanese Patent Application No. 2016-19968, filed Feb. 4, 2016, the content of which is incorporated herein by reference.

BACKGROUND

For example, in various rotary machines including a rotor such as a compressor, a turbine, a pump, an engine, and so on, a bearing device is used to rotatably support the rotor.

As the bearing device, a gas bearing device including a tilting pad is known. This tilting pad serves to swingably support a bearing pad having a pad surface slidably in contact with the rotor. In the gas bearing device, as the rotor rotates, a gas which is present around the rotor is drawn into a space between an outer circumferential surface of the rotor and an inner circumferential surface of the bearing pad to form a membrane (gas membrane) formed of the gas, and thus the rotor is rotatably supported. Here, the gas is drawn into the space between the outer circumferential surface of the rotor and the inner circumferential surface of the bearing pad and then compressed, and a dynamic pressure is generated. Due to this dynamic pressure, the rotor is supported without coming into direct contact with the bearing pad.

For example, Patent Documents 1 and 2 disclose such a bearing device having a constitution in which a ceramic coating and a fixed lubricant coating are respectively applied to an inner circumferential surface of a bearing pad to minimize frictional resistance generated between the bearing pad and a rotor when a dynamic pressure due to a gas membrane is small.

CITATION LIST

Patent Document

[Patent Document 1]
Japanese Unexamined Patent Application, First Publication No. H3-121306
[Patent Document 2]
Japanese Unexamined Patent Application, First Publication No. H7-317752

As compared with an oil bearing device in which an oil membrane is interposed between a bearing pad and a rotor, a gas bearing device in which a gas membrane is interposed between a bearing pad and a rotor has a low viscosity of the gas membrane. Therefore, in the gas bearing device, a load capacity that can be supported by the bearing device is small. In the gas bearing device, to increase the load capacity of the bearing device, it is necessary to reduce the thickness of the gas membrane.

However, when the thickness of the gas membrane becomes smaller, the bearing pad and the rotor easily come into direct contact with each other when the dynamic pressure due to the gas membrane is small. As a result, the bearing pad may be heated and thermally deformed due to frictional heat or the like generated by sliding between the bearing pad and the rotor.

Thermal deformation of the bearing pad occurs with a pivot point swingably supporting the bearing pad as a fulcrum. Therefore, when the bearing pad is thermally deformed, a deformation amount becomes larger moving away from the pivot point, uniformity of a contact state between the bearing pad and the rotor is impaired, and thus it is difficult to increase the load capacity in the bearing device.

SUMMARY

One or more embodiments of the present invention provide a tilting pad gas bearing in which a thickness of a gas membrane is able to be reduced and a load capacity increased by minimizing thermal deformation of a bearing pad.

According to one or more embodiments of the present invention, a tilting pad gas bearing includes a bearing pad and a pivot member. A plurality of bearing pads are disposed in a circumferential direction of a rotor. Each of the bearing pads forms a gas membrane between the bearing pads and an outer circumferential surface of the rotor and supports the rotor. The pivot member swingably supports the bearing pads. Each of the bearing pads includes a pad main body and a heat insulating material layer. The pad main body is supported by the pivot member. The heat insulating material layer is formed on a side of the pad main body facing the outer circumferential surface of the rotor. The heat insulating material layer is formed of a material having a thermal conductivity lower than that of the pad main body.

According to one or more embodiments of the present invention, since the heat insulating material layer is provided on the side of the bearing pad facing the outer circumferential surface of the rotor, it is possible to minimize frictional heat or the like generated at the time of rotation of the rotor being transferred to the pad main body even when a dynamic pressure due to the gas membrane is small and a clearance between the rotor and the heat insulating material layer is small. Accordingly, the pad main body is hardly deformed.

According to one or more embodiments of the present invention, the heat insulating material layer may have a thermal conductivity of 1.0 [W/mK] or less.

According to one or more embodiments of the present invention, due to such a constitution, it is possible to enhance a heat insulating effect in the heat insulating material layer and to effectively minimize deformation of the pad main body.

According to one or more embodiments of the present invention, the pad main body may be formed of a material having a thermal conductivity of 200 [W/mK] or more.

According to one or more embodiments of the present invention, since the pad main body is formed of a material having a high thermal conductivity, a temperature distribution does not easily occur in the pad main body when heat is transferred from a side of a sliding surface with respect to the rotor. Therefore, the thermal deformation of the entire pad can be minimized.

According to one or more embodiments of the present invention, the pad main body may be formed of a material having a linear expansion coefficient of $5e^{-6}$ [1/° C.] or less.

According to one or more embodiments of the present invention, since the pad main body is formed of a material having a low linear expansion coefficient, even when heat is transferred from the side of the sliding surface with the rotor, the pad main body is hardly thermally deformed.

According to one or more embodiments of the present invention, the heat insulating material layer may be formed of a material having a Young's modulus lower than that of the pad main body.

According to one or more embodiments of the present invention, due to such a constitution, the heat insulating material layer is deformed by a pressure generated by the rotation of the rotor to follow a curvature of the rotor. Therefore, it is possible to enlarge a region in which a gap between the rotor and the heat insulating material layer is narrow. As a result, a load capacity of the tilting pad gas bearing can be improved.

According to one or more embodiments of the present invention, a gas supply unit which is configured to supply a gas between a sliding surface of a bearing pad facing the outer circumferential surface of the rotor and the outer circumferential surface of the rotor may be provided in the tilting pad gas bearing.

According to one or more embodiments of the present invention, when the pressure due to the gas membrane interposed between the sliding surface of the bearing pad and the outer circumferential surface of the rotor is low, such as a case in which the rotor is stopped or a case in which a rotation speed of the rotor is low, the pressure of the gas membrane can be increased by supplying the gas between the sliding surface of the bearing pad and the outer circumferential surface of the rotor with the gas supply unit. As a result, direct contact between the bearing pad and the rotor can be minimized, and generation of frictional heat between the bearing pad and the rotor can be minimized. The sliding surface of the bearing pad can be further cooled by the gas supplied by the gas supply unit. Therefore, the occurrence of thermal deformation of the bearing pad can be minimized.

According to one or more embodiments of the present invention, the gas supply unit may include an outlet port formed in the sliding surface of the bearing pad, a gas supply source configured to supply a gas to the outlet port, and a control unit configured to control blowing of the gas from the outlet port.

According to one or more embodiments of the present invention, since a gas is blown onto the outer circumferential surface of the rotor from the outlet port due to such a constitution, the gas can be efficiently supplied between the rotor and the bearing pad to form the gas membrane. Further, a timing of supplying the gas between the sliding surface of the bearing pad and the outer circumferential surface of the rotor can be controlled by the control unit. Therefore, when the pressure of the gas membrane between the sliding surface of the bearing pad and the outer circumferential surface of the rotor is low, such as a case in which the rotor is stopped, or a case in which the rotational speed of the rotor is low, it is possible to supply the gas at an appropriate timing.

According to one or more embodiments of the present invention, the outlet port may be formed in the bearing pad located below a central axis of the rotor.

According to one or more embodiments of the present invention, in the bearing pad located below the central axis of the rotor, when the pressure of the gas membrane between the sliding surface of the bearing pad and the outer circumferential surface of the rotor is low, the sliding surface of the bearing pad and the outer circumferential surface of the rotor are likely to come into contact with each other due to a weight of the rotor. Therefore, the outlet port is formed in the bearing pad located below the central axis of the rotor. Accordingly, the gas membrane can be formed between the rotor and the bearing pad below the central axis of the rotor. Therefore, direct contact between the rotor and the bearing pad can be minimized.

According to one or more embodiments of the present invention, the control unit may supply the gas in at least one of a case in which rotation of the rotor is started and a case in which the rotation thereof is stopped.

According to one or more embodiments of the present invention, when the rotation of the rotor is started or stopped, the pressure of the gas membrane is lower at a lower side located below the central axis of the rotor, and the rotor and the bearing pad easily come into direct contact with each other. Therefore, direct contact between the rotor and the bearing pad can be minimized by supplying the gas between the rotor and the bearing pad at the start of rotation of the rotor or stopping of rotation thereof.

According to the above-described tilting pad gas bearing in accordance with one or more embodiments of the present invention, it becomes possible to reduce the thickness of the gas membrane and to increase the load capacity by minimizing thermal deformation of the bearing pad.

DETAILED DESCRIPTION

Hereinafter, a tilting pad gas bearing according to embodiments of the present invention will be described with reference to the drawings.

Figure 1:
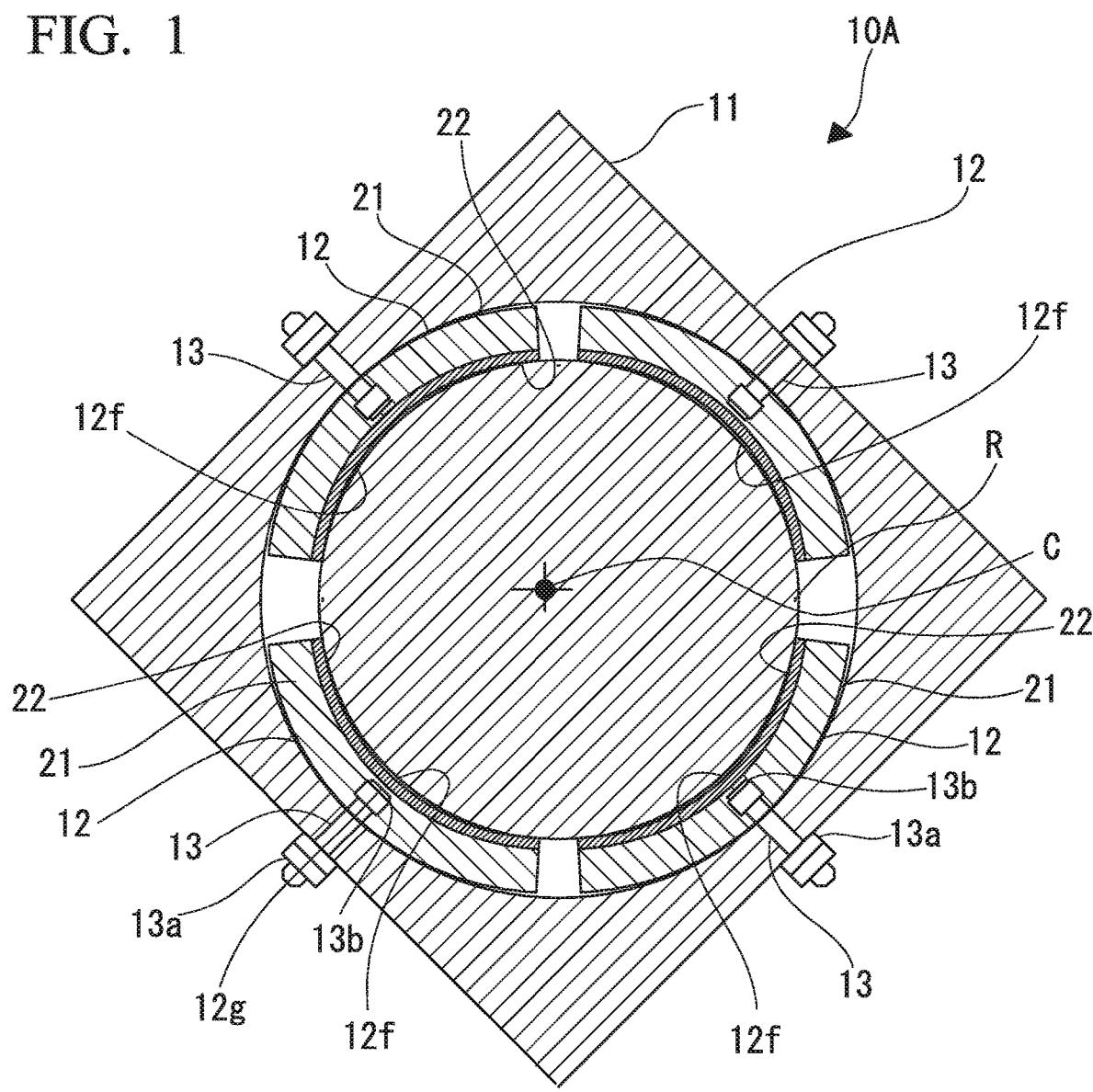
FIG. 1 is a view showing an entire constitution of a tilting pad gas bearing according to one or more embodiments of the present invention and is a cross-sectional view when seen in a direction of a central axis of a rotor.
Figure 2:
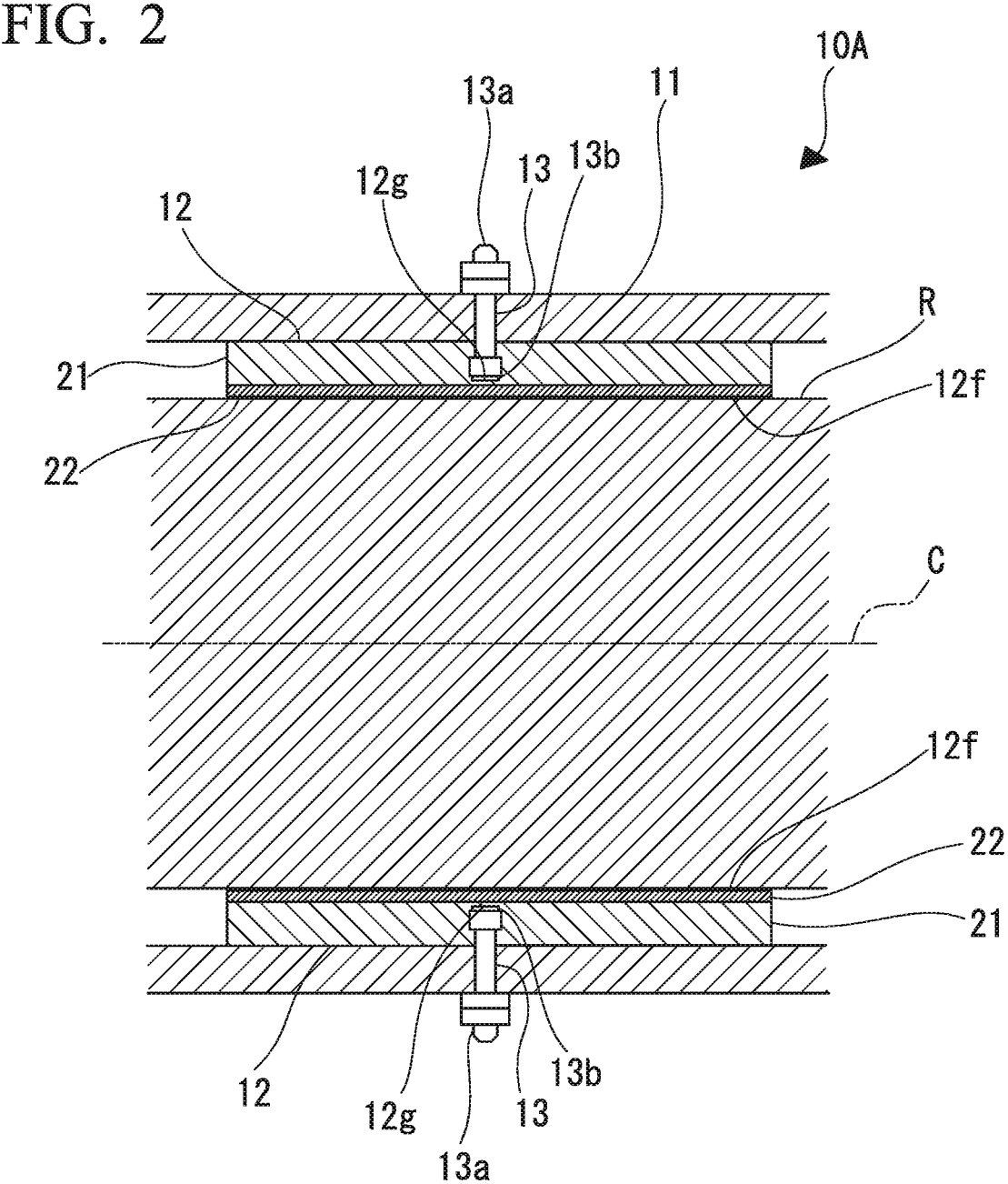
FIG. 2 is a view showing the constitution of the tilting pad gas bearing and is a cross-sectional view taken along a central axis of the rotor in accordance with one or more embodiments of the present invention.

FIG. 1 is a view showing an entire constitution of a tilting pad gas bearing according to one or more embodiments of the present invention and is a cross-sectional view when seen in a direction of a central axis of a rotor. FIG. 2 is a view showing the constitution of the tilting pad gas bearing and is a cross-sectional view taken along a central axis of the rotor.

As shown in FIGS. 1 and 2, a gas bearing device (tilting pad gas bearing) 10A of one or more embodiments rotatably supports a rotor R of a rotary machine (not shown). The gas bearing device 10A includes a housing 11 and a bearing pad 12.

The housing 11 has a tubular shape which is continuous in a direction of a central axis C of the rotor R. The housing 11 has an internal space having a circular cross section.

A plurality of (four in an example of FIG. 1) bearing pads 12 are provided inside the housing 11 in a circumferential direction around the central axis C. Each of the bearing pads 12 is swingably supported by the housing 11 via a pivot member 13.

Each of the bearing pads 12 is formed in a plate shape curved to have an arc-shaped cross section which is concave toward the central axis C of the rotor R. A radius of curvature of a sliding surface 12f of the bearing pad 12 on an inner side in a curving direction is formed to be slightly larger than a radius of curvature of an outer circumferential surface of the rotor R. That is, an entire surface of the sliding surface 12f of the bearing pad 12 does not come into contact with the rotor R at one time.

A base end portion 13a of the pivot member 13 is fixed to the housing 11. The pivot member 13 passes through the housing 11 and protrudes into an internal space of the housing 11 toward the central axis C. A distal end portion 13b of the pivot member 13 is in contact with a concave portion 12g formed in an outer circumferential surface of the bearing pad 12 on an outer circumferential side in the curving direction. The distal end portion 13b of the pivot member 13 has a hemispherical contact portion with the bearing pad 12. Therefore, the bearing pad 12 is swingably supported by the distal end portion 13b of the pivot member 13.

The bearing pad 12 includes a pad main body 21 and a heat insulating material layer 22.

The pad main body 21 is made of a material having a high thermal conductivity or a material having a low coefficient of linear expansion in order to minimize thermal deformation.

A thermal conductivity of a material forming the pad main body 21 may be set to 200 [W/mK] or more, or even 300 [W/mK] or more. As such a material having a high thermal conductivity, for example, a copper alloy (for example, chromium copper or the like) can be used. Here, as the copper alloy, an alloy composed of chromium, zirconium and copper can be used. Further, in addition to a copper alloy, an aluminum alloy of which a main component is aluminum may be used as the material having the high thermal conductivity.

A linear expansion coefficient of the material forming the pad main body 21 may be set to $5e^{-6}$ [1/° C.] or less, furthermore $1.2e^{-6}$ [1/° C.] or less. As described above, for example, Invar (registered trademark) alloy may be used as a material having a small linear expansion coefficient. Here, the Invar (registered trademark) alloy may be an alloy composed of iron and nickel. Further, in addition to the Invar (registered trademark) alloy, a Kovar alloy composed of iron, nickel, and cobalt may be used as the material having a small linear expansion coefficient.

The heat insulating material layer 22 minimizes transmission of heat from the rotor R to the pad main body 21. The heat insulating material layer 22 is formed of a material having a thermal conductivity lower than that of the pad main body 21. In order to efficiently exert a heat insulating effect, the heat insulating material layer 22 may have a thermal conductivity of, for example, 1.0 [W/mK] or less, furthermore 0.3 [W/mK] or less. As such a material having a low thermal conductivity, for example, a ceramic material such as zirconia (thermal conductivity: 1.0 [W/mK]), or a resin material such as polyetheretherketone (PEEK) resin (thermal conductivity: 0.25 [W/mK]) may be used. As the PEEK, a material that does not contain carbon fibers can be used. In this manner, the material can be made softer than the PEEK containing carbon fiber, and when it comes into contact with the rotor R, it wears and readily adapts thereto. By using such PEEK, a surface roughness becomes smaller, and a burning risk can be reduced. The PEEK that does not contain carbon fiber is deformed by a pressure to increase a region having a narrow gap between the rotor R and the bearing pad 12, thereby improving a load capacity.

When the PEEK resin is used for the heat insulating material layer 22, the PEEK resin is previously sintered and bonded to the pad main body 21 with an adhesive or the like. When zirconia is used for the heat insulating material layer 22, zirconia is sprayed onto the pad main body 21.

For example, in order to obtain a sufficient heat insulating effect, the heat insulating material layer 22 may have a thickness of about 3 [mm]. The heat insulating material layer 22 in accordance with one or more embodiments is an exemplary example of a case in which the thickness is formed uniformly.

The heat insulating material layer 22 may be formed of a material having a lower Young's modulus than that of the pad main body 21. Due to such a constitution, the heat insulating material layer 22 is deformed by a pressure generated by rotation of the rotor R to follow a curvature of the rotor R. Therefore, it is possible to increase the region having a narrow gap between the rotor R and the heat insulating material layer 22. As a result, the load capacity of the gas bearing device 10A can be improved.

In the gas bearing device 10A of one or more embodiments described above, the bearing pad 12 includes the heat insulating material layer 22 on a side facing the outer circumferential surface of the rotor R. Therefore, it is possible to minimize transmission of the heat from the rotor R side to the pad main body 21. Accordingly, even when a pressure of a gas membrane interposed between the rotor R and the bearing pad 12 is low and frictional heat is generated between the rotor R and the pad main body 21, or the like, the heat is not easily transferred to the pad main body 21, and thermal deformation of the bearing pad 12 can be minimized.

The heat insulating material layer 22 formed of a material having a low thermal conductivity can further enhance the heat insulating effect of the heat insulating material layer 22 and can effectively minimize the deformation of the pad main body 21.

Even when heat is transferred from a side of the sliding surface 12f with respect to the rotor R, it is difficult for a temperature distribution to be caused in the pad main body 21 formed of a material having a high thermal conductivity and thus thermal deformation of the pad main body 21 can be minimized.

The pad main body 21 formed of a material having a low linear expansion coefficient is not easily thermally deformed even when the heat is transferred from the side of the sliding surface 12f with the rotor R.

A thickness of the gas membrane can be reduced by minimizing the thermal deformation of the bearing pad 12 as described above. Therefore, it is possible to increase the load capacity of the gas bearing device 10A.

Figure 3:
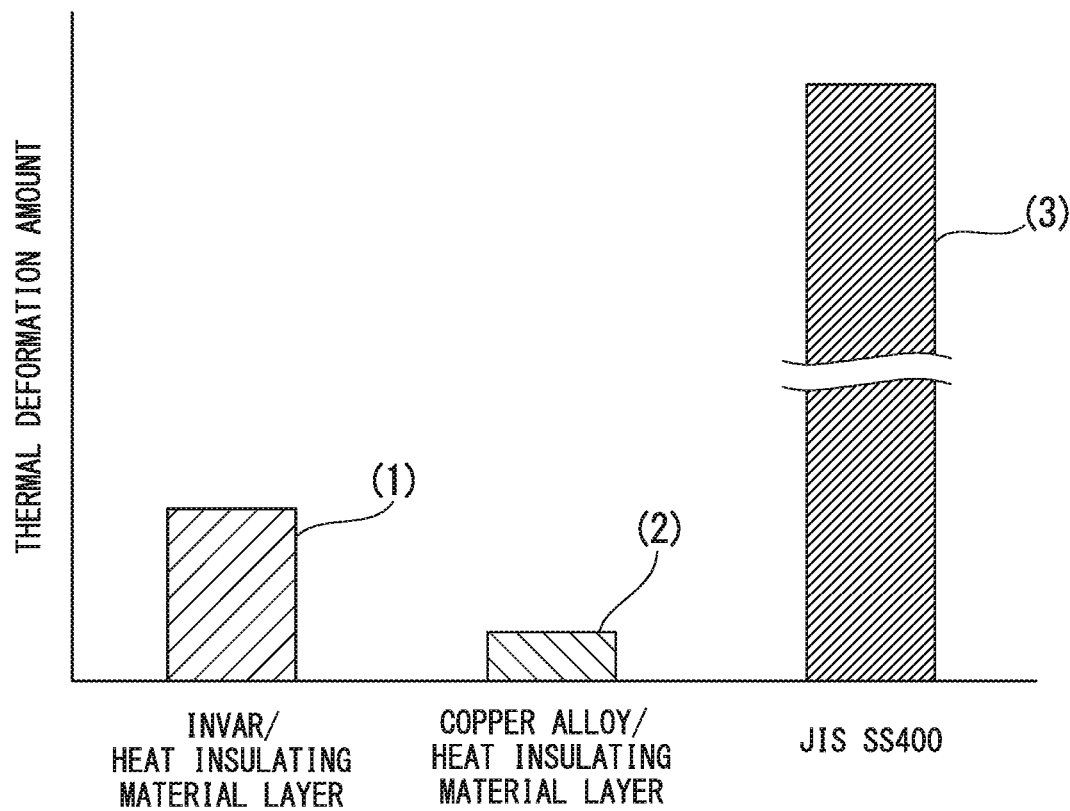
FIG. 3 is a diagram showing a degree of thermal deformation amount in a case of the constitution shown in one or more embodiments described above having a heat insulating material layer while using an Invar alloy or a copper alloy for a pad main body and a case in which the heat insulating material layer is not provided and a pad main body is formed of JIS SS400.

FIG. 3 is a diagram showing a degree of thermal deformation amount in a case of the constitution shown in one or more embodiments described above having the heat insulating material layer while using the Invar alloy or the copper alloy for the pad main body and a case in which the heat insulating material layer is not provided and the pad main body is formed of JIS SS400.

The case in which the Invar alloy is used for the pad main body 21 and the heat insulating material layer 22 is provided is defined as (1). The case in which the copper alloy is used for the pad main body 21 and the heat insulating material layer 22 is provided is defined as (2). The case in which the bearing pad is formed of only the JIS SS400 is defined as (3). Then, as shown in FIG. 3, each of the cases (1) and (2) in which the heat insulating material layer 22 is provided and the pad main body 21 is formed of the copper alloy having the high thermal conductivity and the Invar alloy having the low linear expansion coefficient have significantly smaller thermal deformation than the case (3) in which the bearing pad is formed of only the JIS SS400.

Next, a tilting pad gas bearing according to one or more embodiments of the present invention will be described. In one or more embodiments to be described below, since only the constitution including a gas supply mechanism 30 is different from that of one or more embodiments described above, parts the same as those of the above-described embodiments are designated by the same reference numerals, and duplicated explanation thereof will be omitted.

Figure 4:
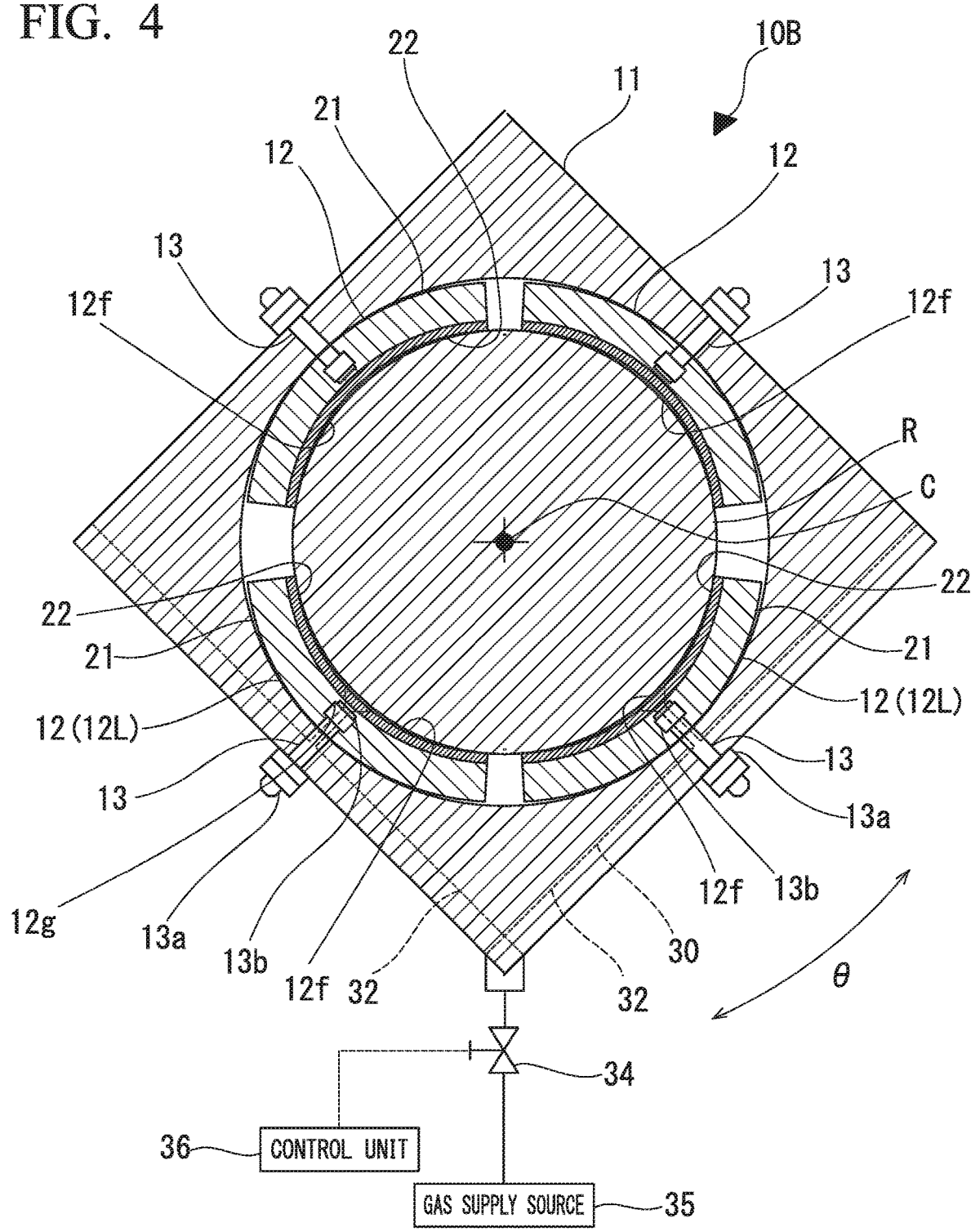
FIG. 4 is a view showing an entire constitution of a tilting pad gas bearing according to one or more embodiments of the present invention and is a cross-sectional view when seen in the direction of the central axis of the rotor.

FIG. 4 is a view showing an entire constitution of the tilting pad gas bearing according to one or more embodiments of the present invention and is a cross-sectional view when seen in the direction of the central axis of the rotor.

As shown in FIG. 4, the gas bearing device (tilting pad gas bearing) 10B of one or more embodiments rotatably supports the rotor R as in one or more embodiments described above. The gas bearing device 10B includes a housing 11 and a bearing pad 12.

The bearing pad 12 is provided inside the housing 11. A plurality of (four in the example of FIG. 4) bearing pads 12 are provided in the circumferential direction around the central axis C. Each of the bearing pads 12 is swingably supported by the housing 11 via a pivot member 13.

Each of the bearing pads 12 is formed in a plate shape curved in an arc shape when seen in the direction of the central axis C of the rotor R. A radius of curvature of a sliding surface 12f of the bearing pad 12 on an inner side in a curving direction is formed to be slightly larger than a radius of curvature of an outer circumferential surface of the rotor R.

Figure 5:
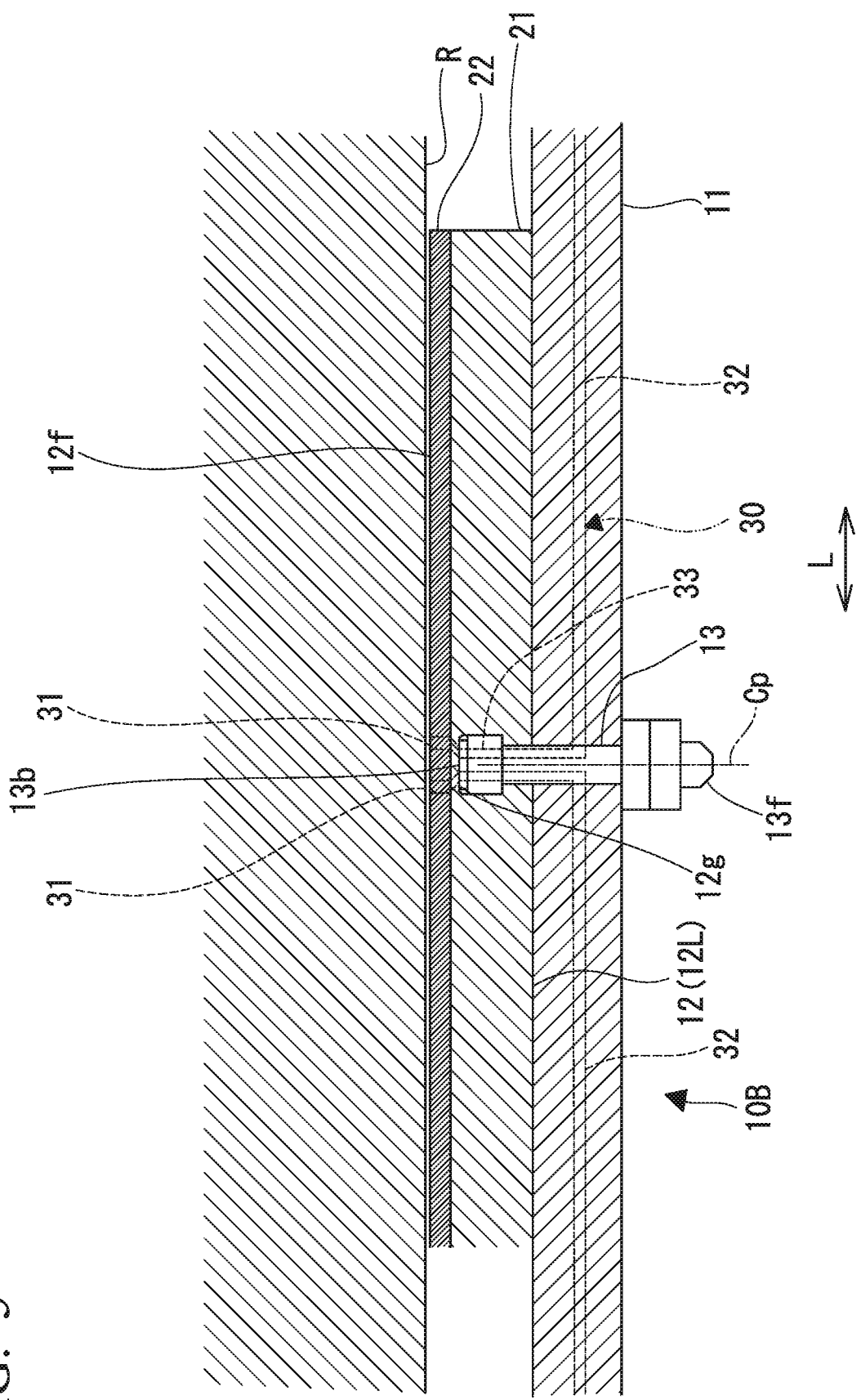
FIG. 5 is a view showing the constitution of the tilting pad gas bearing and is a cross-sectional view taken along the central axis of the rotor in accordance with one or more embodiments of the present invention.

FIG. 5 is a view showing the constitution of the tilting pad gas bearing and is a cross-sectional view taken along the central axis of the rotor.

As shown in FIG. 5, a base end portion 13a of the pivot member 13 is fixed to the housing 11. The pivot member 13 is formed to protrude inside the housing 11. A distal end portion 13b of the pivot member 13 is in contact with a concave portion 12g formed in an outer circumferential side of the bearing pad 12 in the curving direction. The distal end portion 13b of the pivot member 13 is formed so that a contact portion thereof with respect to the concave portion 12g of the bearing pad 12 has a hemispherical shape. Therefore, the bearing pad 12 is swingably supported by the distal end portion 13b of the pivot member 13.

The distal end portion 13b of the pivot member 13 is in contact with a position (hereinafter, this position will be referred to as a pivot center Cp) at which a center of a length of the bearing pad 12 in an axial direction L along the central axis C and a center of a length of the bearing pad 12 in a circumferential direction θ (refer to FIG. 4) intersect.

As shown in FIG. 4, in the gas bearing device 10B, the gas supply mechanism (gas supply unit) 30 for supplying a static pressure gas between a bearing pad 12L and the rotor R is provided in the bearing pad 12L located below the central axis C of the rotor R.

Figure 6:
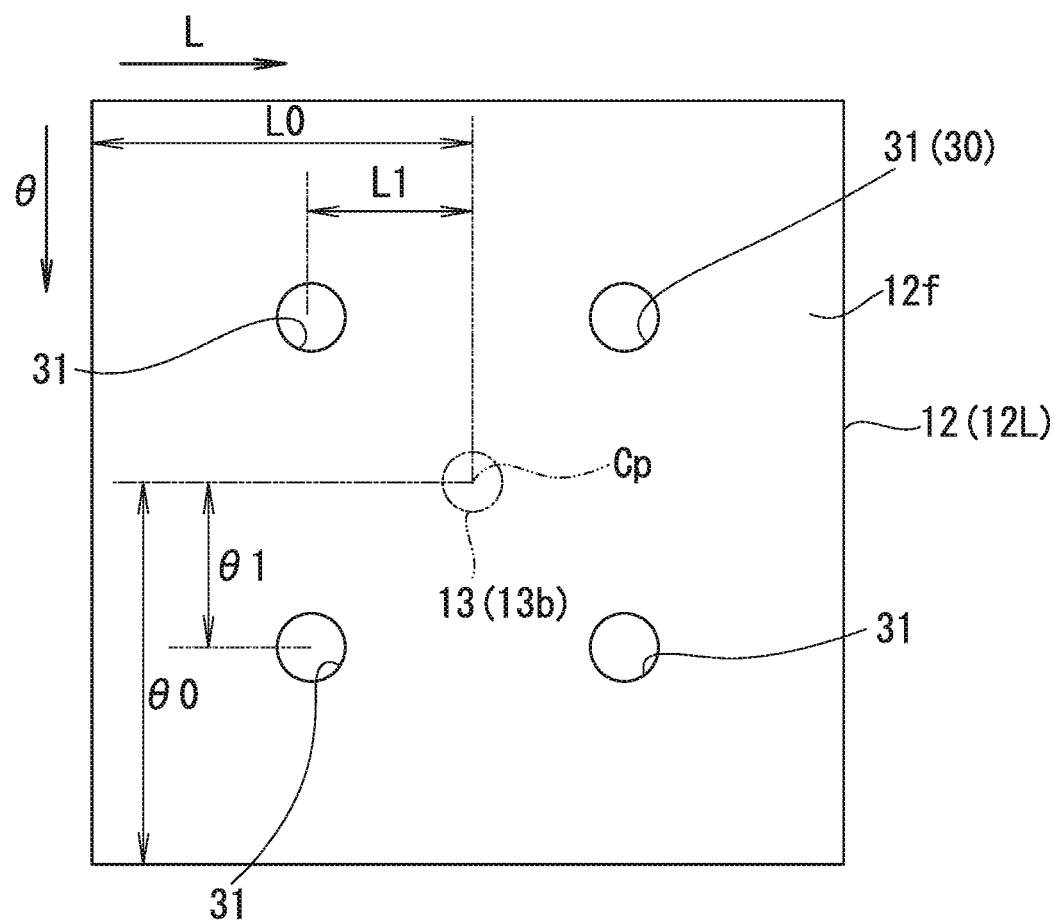
FIG. 6 is a view showing an arrangement of outlet ports formed in the bearing pad and is a view of the bearing pad when seen from the sliding surface side in accordance with one or more embodiments of the present invention.

FIG. 6 is a view showing an arrangement of an outlet port formed in the bearing pad and is a view of the bearing pad when seen from the sliding surface.

As shown in FIGS. 5 and 6, the gas supply mechanism 30 has an outlet port 31 in a sliding surface 12f facing the outer circumferential surface of the rotor R in each of the bearing pads 12L. The outlet port 31 is formed at a plurality of positions at regular intervals in an outer circumferential side of the pivot center Cp in which the distal end portion 13b of the pivot member 13 is in contact with the bearing pad 12L. In the example of FIG. 6, four outlet ports 31 are formed at regular intervals on a concentric circle around the pivot center Cp.

As shown in FIG. 5, gas supply paths 32 and 33 communicating with the outlet ports 31 are formed in the housing 11 and the pivot member 13. As shown in FIG. 4, a gas supply source 35 for supplying the static pressure gas, such as a cylinder (not shown), is connected to the gas supply path 32 formed in the housing 11. The gas supply path 33 formed in the pivot member 13 is formed to connect the gas supply path 32 of the housing 11 to the outlet port 31.

An on-off valve 34 for intermittently supplying the static pressure gas from the gas supply source 35 is formed in the gas supply path 32. As the static pressure gas supplied from the gas supply source 35, for example, atmospheric gas such as air, nitrogen, methane or the like can be used.

The gas supply mechanism 30 blows the static pressure gas supplied from the gas supply source 35 via the gas supply paths 32 and 33 to a space between the sliding surface 12f of the bearing pad 12L and the outer circumferential surface of the rotor R. The gas membrane is formed between the sliding surface 12f of the bearing pad 12L and the outer circumferential surface of the rotor R by the blown static pressure gas, and thus direct contact between the sliding surface 12f of the bearing pad 12L and the outer circumferential surface of the rotor R is minimized.

In each of the outlet ports 31 of such a gas supply mechanism 30, a length θ1 in the circumferential direction θ from the pivot center Cp of the bearing pad 12L and a length L1 in the axial direction L can be set as follows.

In the circumferential direction θ around the center axis C of the rotor R, the outlet ports 31 can be disposed such that θ1/θ0=0.5 to 0.6 with respect to a length θ0 from a outer circumferential portion of the bearing pad 12L to the pivot center Cp.

Figure 7:
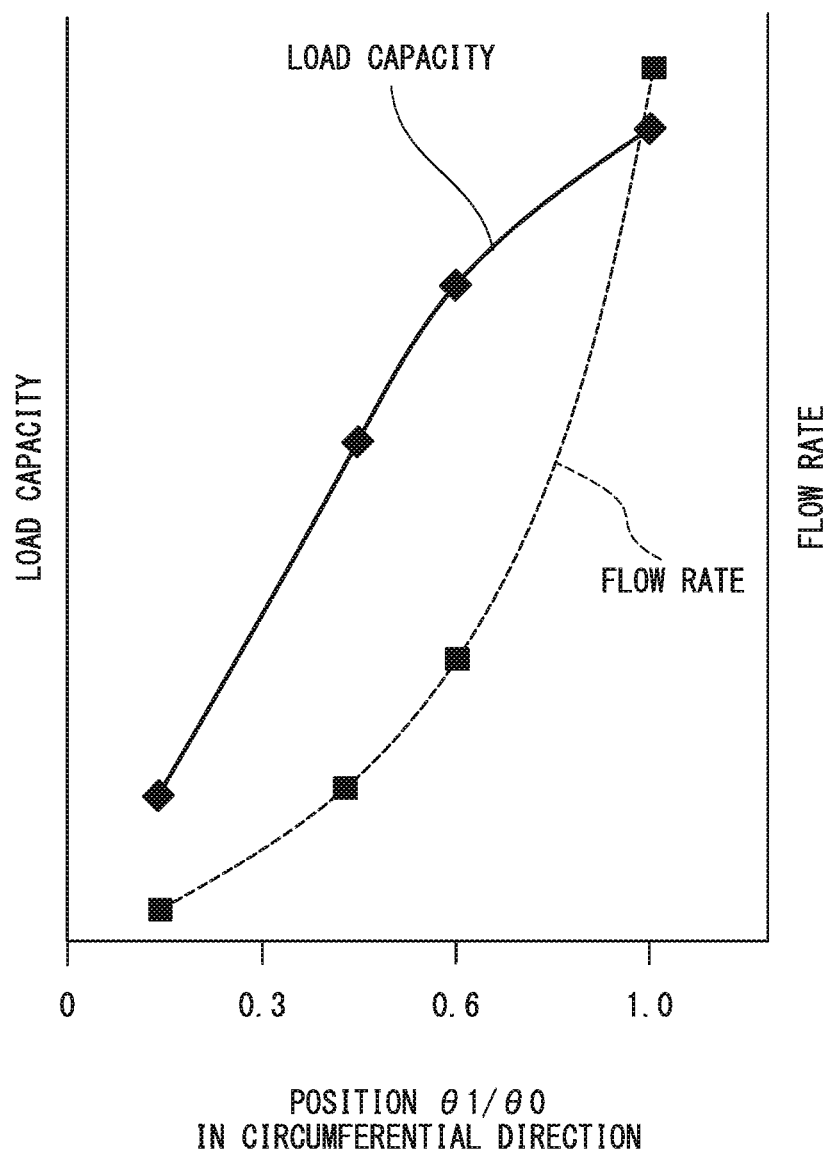
FIG. 7 is a diagram showing relationships between a position of the outlet port in a circumferential direction with respect to a pivot center, a load capacity and a total flow rate in accordance with one or more embodiments of the present invention.

FIG. 7 is a diagram showing a relationship among a position of the outlet port in the circumferential direction with respect to a pivot center, a load capacity and a total flow rate.

As shown in FIG. 7, it is set to a range of θ1/θ0=0.5 to 0.6 from a balance between the load capacity and the total flow rate. As a result, a large load capacity can be obtained with a small flow rate.

In the axial direction L of the rotor R, the outlet ports 31 can be disposed to be L1/L0=0.4 with respect to the length L0 from the outer circumferential portion of the bearing pad 12L to the pivot center Cp.

Figure 8:
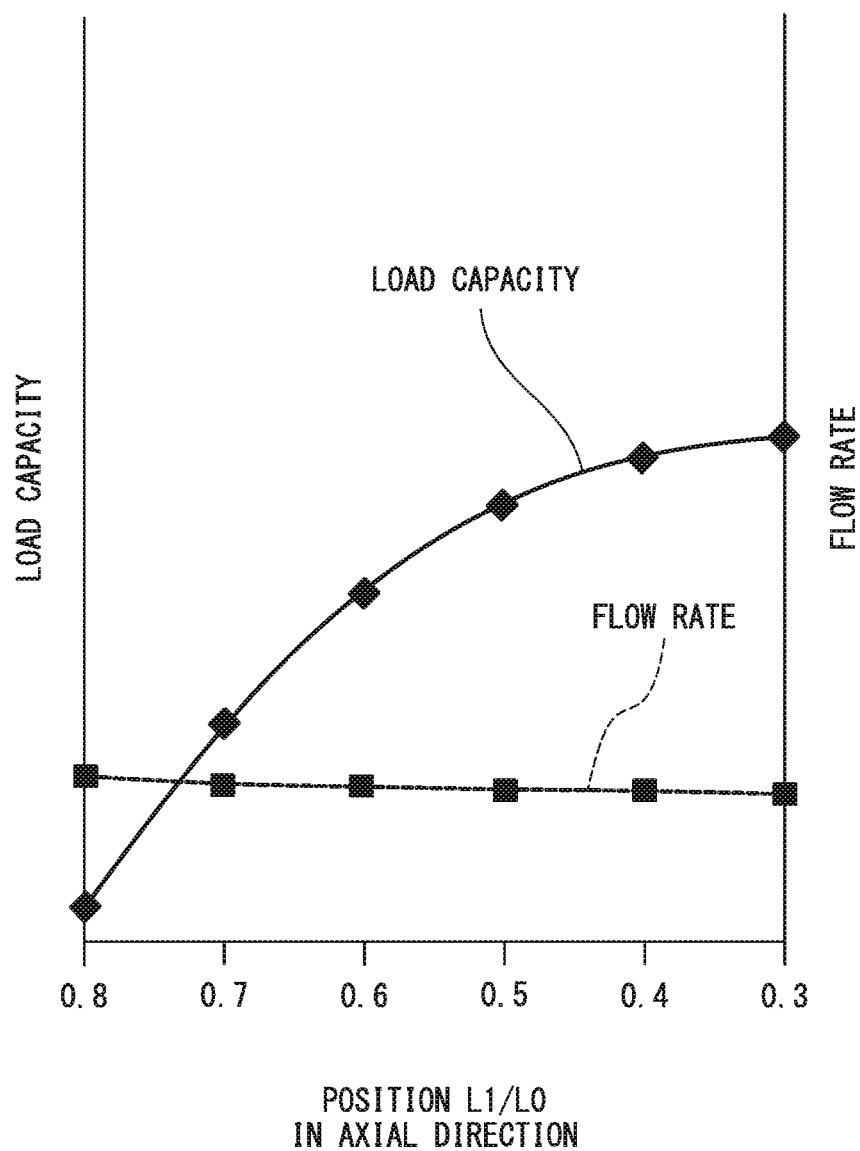
FIG. 8 is a diagram showing the relationship among the position of the outlet port with respect to the pivot center in an axial direction, the load capacity and the total flow rate in accordance with one or more embodiments of the present invention.

FIG. 8 is a diagram showing the relationship among the position of the outlet port with respect to the pivot center in an axial direction, the load capacity and the total flow rate.

As shown in FIG. 8, when L1/L0≤0.4, the load capacity converges.

A dynamic pressure when the rotor R is rotating is highest in the vicinity of the pivot center. That is, an influence on the load capacity becomes large in the vicinity of the pivot center, and when the outlet ports 31 are disposed in the vicinity of the pivot center, there is a risk that the load capacity will be reduced. Therefore, the relationship among the position of the outlet port 31 in the axial direction, the load capacity and the total flow rate is advantageous in that the risk of reduction in the load capacity can be reduced when L1/L0=0.4 as described above.

The gas supply mechanism 30 includes a control unit 36 which controls opening and closing of the on-off valve 34, or the like. In the control unit 36, when it is detected that a rotary machine (not shown) including the rotor R has been activated or an operation of the rotary machine (not shown) has stopped, the static pressure gas is supplied from the outlet port 31 to the space between the bearing pad 12L and the rotor R.

Figure 9:
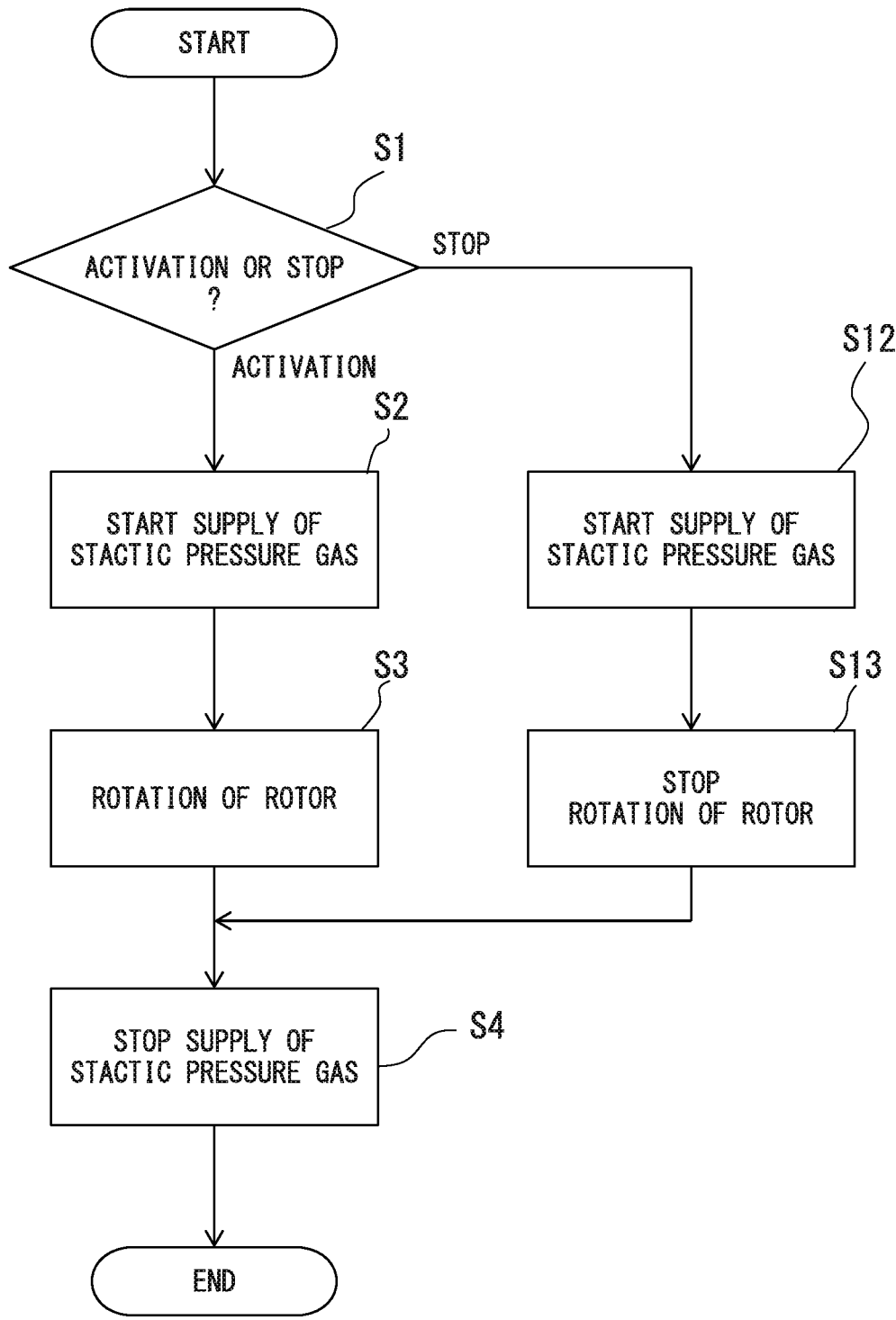
FIG. 9 is a diagram showing a flow of supply control of a static pressure gas performed by a control unit of a gas supply mechanism in accordance with one or more embodiments of the present invention.

FIG. 9 is a diagram showing a flow of supply control of the static pressure gas performed by the control unit of the gas supply mechanism.

As shown in FIG. 9, when it is detected that a predetermined operation for activating the rotary machine (not shown) having the rotor R is performed ("activation" in Step S1), the control unit 36 opens the on-off valve 34 to supply the static pressure gas from the gas supply source 35 (Step S2). The static pressure gas passes through the gas supply path 32 and is delivered from the outlet port 31 to a gap between the bearing pad 12L and the rotor R. Then, due to a pressure of the static pressure gas, the rotor R rises against its own weight, and a suitable clearance is formed between the bearing pad 12L and the rotor R. Here, a path for the static pressure gas is narrow at the outlet port 31 (so-called self-formed aperture), and thus the load capacity at the time of supplying the static pressure gas can be increased.

After start of supply of the static pressure gas, rotation of the rotor R starts (Step S3).

When a predetermined time elapses after start of rotation of the rotor R, the control unit 36 closes the on-off valve 34. Therefore, the supply of the static pressure gas is stopped (Step S4), and the rotary machine is switched to a normal operation state. In this normal operation state, the gas membrane is formed between all the bearing pads 12 including the lower bearing pad 12L and the rotor R by the dynamic pressure of the gas drawn into the space between the bearing pad 12 and the rotor R from the periphery due to the rotation of the rotor R.

When the control unit 36 detects that the predetermined operation for stopping the rotary machine (not shown) is performed ("stop" in Step S1), the control unit 36 opens the on-off valve 34 and supplies the static pressure gas from the gas supply source 35 (Step S12). The static pressure gas passes through the gas supply paths 32 and 33 and is delivered from the outlet port 31 to the gap between the bearing pad 12L and the rotor R.

After the supply of the static pressure gas starts, the control unit 36 stops the rotation of the rotor R (Step S13). Therefore, the pressure (dynamic pressure) of the gas membrane gradually decreases until the rotor R in a normal operation state stops, but the pressure of the gas membrane is compensated for by the static pressure gas. Accordingly, the rotor R is continuously supported by the bearing pad 12 via the gas membrane.

After the rotor R has stopped, the control unit 36 closes the on-off valve 34 and stops the supply of the static pressure gas (Step S4).

The gas bearing device 10B of one or more embodiments includes the gas supply mechanism 30. Due to the gas supply mechanism 30, even when the pressure of the gas membrane interposed between the sliding surface 12f of the bearing pad 12 and the outer circumferential surface of the rotor R is low, the static pressure gas (gas) can be supplied between the sliding surface 12f of the bearing pad 12 and the outer circumferential surface of the rotor R. Therefore, it is possible to minimize direct contact between the bearing pad 12 and the rotor R. Accordingly, generation of the frictional heat between the bearing pad 12 and the rotor R can be minimized. Further, the sliding surface 12f of the bearing pad 12 and the rotor R can be cooled by the supplied static pressure gas.

Therefore, occurrence of the thermal deformation of the bearing pad 12 can be minimized.

The gas supply mechanism 30 can control a timing at which the static pressure gas is supplied between the sliding surface 12f of the bearing pad 12 and the outer circumferential surface of the rotor R by the control unit 36. Therefore, it is possible to supply the static pressure gas at an appropriate timing, such as when the pressure of the gas membrane between the sliding surface 12f of the bearing pad 12 and the outer circumferential surface of the rotor R is low.

Further, the outlet port 31 is formed in the bearing pad 12 located below the central axis of the rotor R. In the bearing pad 12 located below the central axis of the rotor R, when the air membrane between the sliding surface 12f of the bearing pad 12 and the outer circumferential surface of the rotor R is insufficient due to the weight of the rotor R, the sliding surface 12f of the bearing pad 12 and the outer circumferential surface of the rotor R are likely to come into contact with each other. Therefore, it is possible to minimize direct contact between the rotor R and the bearing pad 12 below the central axis of the rotor R by forming the outlet port 31 in the bearing pad 12 located below the central axis of the rotor R.

When the rotation of the rotor R starts (in other words, when the rotation of the rotor R is started) or when the rotation stops (in other words, when the rotation of the rotor R is stopped), the gas membrane is insufficient below the center axis of the rotor R, and the rotor R and the bearing pad 12 are likely to come into direct contact with each other. Therefore, when the rotation of the rotor R is started or stopped, direct contact between the rotor R and the bearing pad 12 can be minimized by supplying the static pressure gas between the rotor R and the bearing pad 12 by the control unit 36.

Further, as described in one or more embodiments above, in the bearing pad 12, the frictional heat generated at the time of the rotation of the rotor R and so on can be prevented from being transferred to the pad main body 21 by providing the heat insulating material layer 22 on the side facing the outer circumferential surface of the rotor R. Therefore, the pad main body 21 is hardly deformed.

Further, the heat insulating effect of the heat insulating material layer 22 can be enhanced by forming the heat insulating material layer 22 of a material having a low thermal conductivity, and the deformation of the pad main body 21 can be effectively minimized.

Further, when heat is transferred from the side of the sliding surface 12f with the rotor R, the temperature distribution does not easily occur in the pad main body 21 due to forming the pad main body 21 of a material having a high thermal conductivity, and thus the thermal deformation of the pad main body 21 can be minimized.

Further, even when heat is transferred from the side of the sliding surface 12f with the rotor R, the pad main body 21 is hardly thermally deformed due to forming the pad main body 21 of a material having a low linear expansion coefficient.

As described above, the thickness of the gas membrane can be reduced by minimizing the thermal deformation of the bearing pad 12, and the load capacity of the gas bearing device 10B can be increased.

Other Modified Examples

The present invention is not limited to the above-described embodiments and includes various modifications to the above-described embodiments within the scope not deviating from the gist of the present invention. That is, the specific forms and constitutions and so one described in the embodiments are merely examples and can be appropriately changed.

For example, in one or more embodiments described, the static pressure gas is supplied when the rotation of the rotor R is started or stopped, but the timing of supplying the static pressure gas is not limited thereto. The static pressure gas may be supplied only when the rotation of the rotor is started or only when the rotation is stopped or may be supplied also in the normal operation state of the rotor.

The sliding surface 12f of the bearing pad 12 may be mirror-finished by polishing processing so that the friction generated between the bearing pad 12 and the rotor R is reduced. A friction coefficient of the sliding surface 12f may be further reduced by subjecting the sliding surface 12f to a surface treatment such as diamond-like carbon (DLC) coating or the like.

Accordingly, damage can be prevented when the bearing pad 12 and the rotor R come into direct contact with each other.

The rotary machine having the rotor R supported by the gas bearing devices 10A and 10B as described above is not limited in any way with respect to its use and constitution.

INDUSTRIAL APPLICABILITY

One or more embodiments of the present invention can be applied to a tilting pad gas bearing. According to this tilting pad gas bearing, it is possible to reduce the thickness of the gas membrane and to increase the load capacity by minimizing the thermal deformation of the bearing pad.

REFERENCE SIGNS LIST 10A, 10B Gas bearing device (tilting pad gas bearing)
11 Housing
12 Bearing pad
12L Bearing pad
12f Sliding surface
12g Concave portion
13 Pivot member
13a Base end portion
13b Distal end portion
21 Pad main body
22 Heat insulating material layer
30 Gas supply mechanism (gas supply unit)
31 Outlet port
32, 33 Gas supply path
34 On-off valve
35 Gas supply source
36 Control unit
C Central axis
Cp Pivot center
R Rotor Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A tilting pad gas bearing comprising:
a plurality of bearing pads disposed in a circumferential direction of a rotor,
wherein the bearing pads support the rotor by forming a gas membrane between the bearing pads and an outer circumferential surface of the rotor;
a pivot member that swingably supports each of the bearing pads, respectively; and
a gas supply unit that is configured to supply a static pressure gas between a sliding surface of each of the bearing pads that faces the outer circumferential surface of the rotor and the outer circumferential surface of the rotor;
wherein:
each of the bearing pads has a curved shape and comprises:
a pad main body supported by the pivot member;
a heat insulating material layer that is:
disposed on the sliding surface of the pad main body that faces the outer circumferential surface of the rotor, and
formed of a material having a thermal conductivity lower than a thermal conductivity of the pad main body; and
a concave portion disposed in an outer circumferential surface on an outer circumferential side of the bearing pad in a curving direction,
a base end of each pivot member is fixed to a housing,
each pivot member has a protruding portion that:
passes through the housing and protrudes into an internal space of the housing toward a central axis of the rotor, and
is in contact with a respective one of the concave portions,
the gas supply unit has an outlet port formed in the sliding surface,
the housing provided with the gas supply unit and each pivot member are provided with a gas supply path communicating with each outlet port,
the outlet port comprises a plurality of outlet ports,
a length $\theta 1$ in the circumferential direction $\theta$ from a pivot center of the bearing pad is set,
a length L1 in the axial direction L from the pivot center of the bearing pad is set,
a length $\theta 0$ in the circumferential direction $\theta$ around the center axis of the rotor from an outer circumferential portion of the bearing pad to the pivot center is set,
a length L0 in the axial direction L of the rotor from the outer circumferential portion of the bearing pad to the pivot center is set, and a placement of the plurality of outlet ports satisfies both expressions:

$$\theta 1/\theta 0 = 0.5 \text{ to } 0.6$$

$$L1/L0 \leq 0.4.$$

2. The tilting pad gas bearing according to claim 1, wherein the heat insulating material layer has a thermal conductivity of less than or equal to 1.0 [W/mK].

3. The tilting pad gas bearing according to claim 1, wherein the pad main body is formed of a material having a thermal conductivity of greater than or equal to 200 [W/mK].

4. The tilting pad gas bearing according to claim 1, wherein the pad main body is formed of a material having a linear expansion coefficient of less than or equal to $5e^{-6}$ [1/° C.].

5. The tilting pad gas bearing according to claim 1, wherein the material of the heat insulating material layer includes a Young's modulus lower than a Young's modulus of the pad main body.

6. The tilting pad gas bearing according to claim 1, wherein the gas supply unit comprises:
  a single gas supply source that supplies the gas to each outlet port; and
  a control unit that is disposed between the single gas supply source and the housing and that controls blowing of the static pressure gas from each outlet port.

7. The tilting pad gas bearing according to claim 6, wherein the outlet port is disposed in the bearing pad located below the central axis of the rotor.

8. The tilting pad gas bearing according to claim 6, wherein the control unit supplies the gas in at least one of when a rotation of the rotor is started and when the rotation of the rotor is stopped.

* * * * *